(12) United States Patent  (10) Patent No.: US 8,869,073 B2
Freeman et al.  (45) Date of Patent: Oct. 21, 2014

(54) HAND POSE INTERACTION

(75) Inventors: Dustin Freeman, Ontario (CA);
Sriganesh Madhvanath, Karnataka (IN); Ankit Shekhawat, Karnataka (IN); Ramadevi Vennelakanti, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 127 days.

(21) Appl. No.: 13/560,698

(22) Filed: Jul. 27, 2012

(65) Prior Publication Data

US 2013/0031517 A1 Jan. 31, 2013

(30) Foreign Application Priority Data

Jul. 28, 2011 (IN) .............................. 2581/CHE/2011

(51) Int. Cl.
*G06F 3/033* (2013.01)
*G06F 3/00* (2006.01)
*G06F 3/01* (2006.01)

(52) U.S. Cl.
CPC ..................................... *G06F 3/017* (2013.01)
USPC .......................................... 715/863; 715/716

(58) Field of Classification Search
USPC ................................................. 715/863, 716
See application file for complete search history.

(56) References Cited

U.S. PATENT DOCUMENTS

| | | | | |
|---|---|---|---|---|
| 6,825,985 B2 * | 11/2004 | Brown et al. | ................. | 359/619 |
| 7,433,024 B2 * | 10/2008 | Garcia et al. | ................. | 356/4.01 |
| 7,551,719 B2 * | 6/2009 | Yokhin et al. | ................... | 378/90 |
| 8,330,727 B2 * | 12/2012 | Westerman et al. | .......... | 345/173 |
| 8,396,252 B2 * | 3/2013 | El Dokor | ...................... | 382/106 |
| 8,582,867 B2 * | 11/2013 | Litvak | ........................... | 382/154 |
| 8,594,425 B2 * | 11/2013 | Gurman et al. | .............. | 382/173 |
| 8,620,113 B2 * | 12/2013 | Yee | ................................ | 382/312 |
| 8,625,855 B2 * | 1/2014 | El Dokor | ...................... | 382/106 |
| 2007/0057946 A1 * | 3/2007 | Albeck et al. | ................ | 345/427 |
| 2007/0060336 A1 * | 3/2007 | Marks et al. | .................... | 463/30 |
| 2008/0018595 A1 * | 1/2008 | Hildreth et al. | ............... | 345/156 |
| 2008/0106746 A1 * | 5/2008 | Shpunt et al. | ................. | 356/610 |
| 2008/0240502 A1 * | 10/2008 | Freedman et al. | ............ | 382/103 |
| 2009/0096783 A1 * | 4/2009 | Shpunt et al. | ................. | 345/419 |
| 2009/0183125 A1 * | 7/2009 | Magal et al. | .................. | 715/863 |
| 2010/0020078 A1 * | 1/2010 | Shpunt | .......................... | 345/420 |
| 2010/0118123 A1 * | 5/2010 | Freedman et al. | ............. | 348/46 |
| 2010/0151946 A1 | 6/2010 | Wilson et al. | | |
| 2011/0158508 A1 * | 6/2011 | Shpunt et al. | ................. | 382/154 |
| 2011/0211044 A1 * | 9/2011 | Shpunt et al. | .................... | 348/46 |
| 2012/0309535 A1 * | 12/2012 | Langridge et al. | ............. | 463/39 |
| 2014/0149950 A1 * | 5/2014 | Mun et al. | ..................... | 715/863 |
| 2014/0152551 A1 * | 6/2014 | Mueller et al. | ................ | 345/156 |
| 2014/0157206 A1 * | 6/2014 | Ovsiannikov et al. | ........ | 715/849 |
| 2014/0157210 A1 * | 6/2014 | Katz et al. | ..................... | 715/863 |
| 2014/0184496 A1 * | 7/2014 | Gribetz et al. | ................ | 345/156 |
| 2014/0237432 A1 * | 8/2014 | Geurts et al. | ................... | 715/863 |

* cited by examiner

*Primary Examiner* — David Phantana Angkool

(57) ABSTRACT

Provided is a method of hand pose interaction. The method recognizes a user input related to selection of an object displayed on a computing device and displays a graphical user interface (GUI) corresponding to the object. The graphical user interface comprises at least one representation of a hand pose, wherein each representation of a hand pose corresponds to a unique function associated with the object. Upon recognition of a user hand pose corresponding to a hand pose representation in the graphical user interface, the function associated with the hand pose representation is executed.

18 Claims, 3 Drawing Sheets

HAND POSE INTERACTION

CLAIM FOR PRIORITY

The present application claims priority under 35 U.S.C 119 (a)-(d) to Indian Patent application number 2581/CHE/2011, filed on Jul. 28, 2011, which is incorporated by reference herein its entirety.

BACKGROUND

As computers have evolved from being primarily focused on data-processing and word processing to enabling more passive consumption of local and internet media and games, the lean-forward or an active mode of engagement is slowly being replaced with a lean-back or a relaxed way of interaction with a computing device from the couch. The traditional tools of engagement, such as a mouse, a keyboard, a track pad, etc., which required overt input from a user are increasingly being disowned in favor of new means of communication, for example, gesturing from a distance. Development of advanced sensors has made it possible for a device to detect human movements, such as those made by hands. Gesture recognition is being used in advanced computing systems and gaming consoles to offer users a natural way of interacting with a machine. Most gesture recognition systems, however, require a user to make extensive movements of hands or arms, which may not be preferred by the user or not desirable in many situations such as passive media consumption or navigation from the couch where the overarching aim is to support a relaxed mode of interaction

BRIEF DESCRIPTION OF THE DRAWINGS

For a better understanding of the solution, embodiments will now be described, purely by way of example, with reference to the accompanying drawings, in which.

DETAILED DESCRIPTION OF THE INVENTION

Computing devices are increasingly moving away from traditional input devices, such as a keyboard, to new interaction modes, such as touch, speech and gestures. These new interaction means are more engaging and natural to humans than the earlier accessory-based input devices, especially for consumption-oriented usage scenarios such as passive media consumption.

For such scenarios, a computing system with a gesture recognition interface provides for a more instinctive, lean-back, human-machine communication from the couch, than a lean-forward input mechanism. A user is not required to be "in touch" with the device and an input may be provided in the form of physical movements, such as those made by hands or fingers.

Most hand gesture recognition interfaces, however, may require substantial movement of hands or fingers. For instance, a gaming application based on hand gesture recognition technology may require a player(s) to make extensive hand and arm movements. In some situations or environment, this may not be desirable. For example, in a scenario where a user simply wants to consume media (audio, video or images) present on a device. In this case, the user might prefer a passive media consumption experience, akin to that provided by a remote control, rather than an interface requiring extensive physical movements.

Embodiments of the present solution provide a method and system for interacting with a computing device using a hand pose(s). A user would be able to interact with a machine using simple hand poses, requiring little or no hand (or arm) movement(s), thereby avoiding the energy-intensive movements associated with present gesture recognition systems.

For the sake of clarity, the term "object", in this document, is meant to be understood broadly. The term may include any data, content, entity, application, or user interface element which is visually presentable and accessible via a user interface on a computing device. By way of example, and not limitation, an "object" may include a media object, such as, text, audio, video, graphics, animation, images (such as, photographs), multimedia, a menu item, a widget, and the like.

Figure 1:
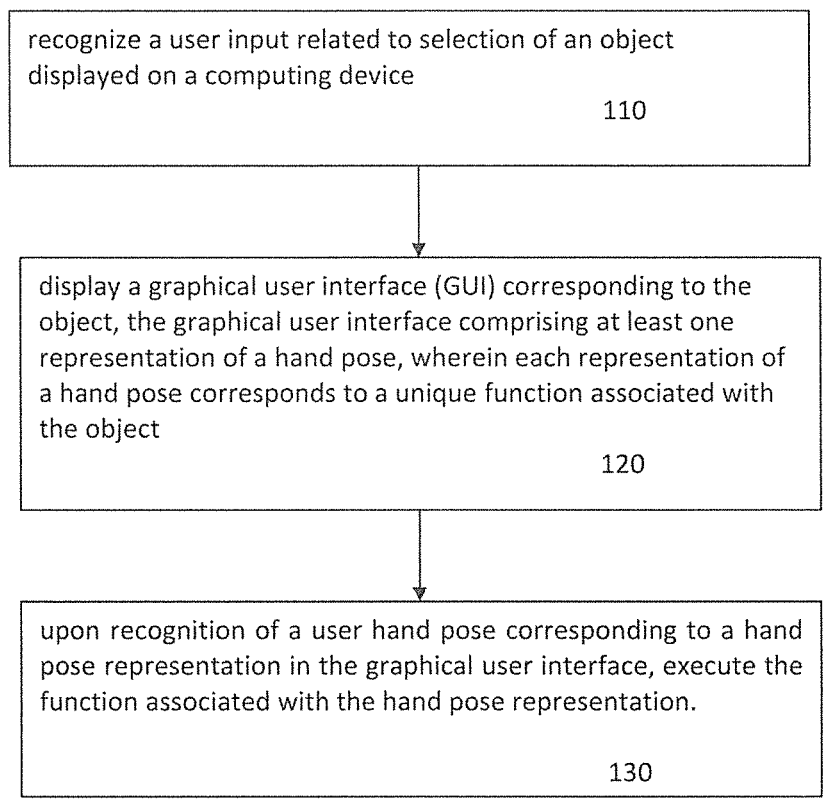
FIG. 1 shows a flow chart of a method of interacting with a computing device using a hand pose, according to an embodiment.

FIG. 1 shows a flow chart of a method of interacting with a computing device using a hand pose, according to an embodiment.

The method may be implemented on a computing device (system), such as, but not limited to, a personal computer, a desktop computer, a laptop computer, a notebook computer, a network computer, a personal digital assistant (PDA), a mobile device, a hand-held device, a television (TV), and the like. A typical computing device that may be used is described further in detail subsequently with reference to FIG. 4.

Additionally, the computing device may be connected to another computing device or a plurality of computing devices via a network, such as, but not limited to, a Local Area Network (LAN), a Wide Area Network, the Internet, or the like.

Referring to FIG. 1, block 110 involves recognizing a user input related to selection of an object displayed on a computing device.

As mentioned above, the term "object", in the context of this document, may include any data, content, entity, application, or user interface element present in a computing device. It may include a media object, such as, text, audio, video, graphics, animation, images (such as, photographs), multimedia, or an interface element, such as a menu item, an icon, or an application, such as a widget.

For instance, in case of a media player application on the computing device, the various interface elements associated with the media player, such as play, pause and stop buttons, shuffle and repeat icons, menu items, media drop down list, etc. may be considered as "objects" in the context of this application. To provide another example, in case a photo browsing application is being used, the interface elements or controls related to the application, such as those connected with resizing, rotating or resizing of an image may be considered as "objects". It would be appreciated that the aforementioned instantiations of "objects" are provided for the purpose of illustration and not by way of limitation.

A user may select an object on a computing device by providing a user input. The user input may be given in various ways. For example, through a freehand gesture interface (by pointing towards the device, for instance), an accessory (such as a keyboard, a mouse, remote control, etc.), a voice command interface or a touch based interface. Again, the aforementioned examples are provided for the purpose of illustration and not by way of limitation.

The computing device recognizes a user input related to selection of an object by appropriate means depending on the input command mode. For example, if a voice command is given to select an object, a microphone along with a voice recognition application may be used to recognize the command. In case a gesture-based input is given, then a gesture recognition system (including hardware and/or programmable instructions) is used to recognize the user input. Considering that a user input could be provided in various ways, multiple configurations of computing device (with appropriate hardware and programmable instructions) may be used to detect user commands.

Once a user input related to selection of an object is received and recognized by the computing device, the object is selected for further user manipulation or control. The selection may be highlighted and displayed to the user.

Upon selection of an object, a graphical user interface (GUI) corresponding to the selected object is displayed on the computing device. The graphical user interface includes at least one representation of a human hand pose, wherein each representation of a hand pose corresponds to a unique function associated with the selected object (block 120).

In another instantiation, the graphical user interface (GUI) corresponding to the selected object may be displayed on a secondary device connected to the primary computing device. For instance, the GUI may be shown on the user's mobile device for an object present on the original computing device. To provide an illustration, let's consider a scenario where a user wants to use a Calculator application (widget) present on the display of his primary computing device, but would rather prefer to do a calculation using his mobile device, since it is more readily available or convenient to use as compared to providing inputs to the primary device, which might be comparatively remote from him. In this case, the user could select the object (Calculator application) by providing an input command (e.g., a voice input by speaking the word "Calculator") to the primary device. Upon selection, the GUI associated with the Calculator application is displayed on the user's mobile device. The user could now manipulate the GUI (carry out a calculation) by providing inputs to his mobile device. The results could be displayed on the mobile device or on the primary device or both, based on user preference.

The secondary device may be a desktop computer, a laptop computer, a tablet personal computer, a notebook computer, a network computer, a personal digital assistant (PDA), a handheld device, a television (TV), a set-top box, and the like. The computing device and the secondary device may be connected via wired (Local area network, etc.) or wireless means (such as, infrared, Bluetooth, WiFi, internet, etc.).

The graphical user interface (GUI) may be in the form of a window, a dialog box, a menu, a tab and/or an icon. It may also be in the form of a control (or widget), such as, a button, text box, radio button, list box, drop-down list, check box, a datagrid etc. The aforementioned instantiations are merely illustrative and the GUI may assume various forms, shapes and sizes. Also, the graphical user interface is user configurable.

The graphical user interface includes one or multiple representations of a hand pose. Each hand pose representation corresponds to a unique human hand pose. The representation of a human hand pose may be in the form of a drawing (cartoon or caricature), an animation, an image (photograph), and the like. Also, a hand pose representation may include a single hand pose or two-hand pose.

Some non-limiting examples of single hand pose representations (based on human hand poses) may include: a fist, an open palm, a pointed figure, a thumbs-up pose, a thumbs-down pose, a V-sign, an OK sign, crossed fingers, a fig sign, hitchhiking pose, and so and so forth. Similarly, some non-limiting examples of two-hand pose representation may include: a time-out sign, folded hands, clasped hands, etc.

In an example, a hand pose representation in the GUI may be pre-defined in the computing device. A pre-defined hand pose representation(s) may be stored in a storage medium on the computing device. In another example, the GUI provides an option to a user to create or select a hand pose representation of his or her choice. A user may create a hand pose representation in the form of a drawing, a cartoon, an animation, an image, and the like.

Each representation of a hand pose in the graphical user interface corresponds to a unique function associated with the selected object. An object may have various functions associated with it. For example, in a media player, an object "video" may have multiple associated functions, such as, "Play", "Pause", "Stop", "Shuffle" and "Repeat" etc. In the context of present application, each of these unique functions is associated with a distinct representation of a hand pose in the graphical user interface. For instance, the "Play" function may be associated with a "pointed finger" representation of a hand pose; the "Pause" function may be linked to an "open palm" hand pose representation; the "Stop" function may be correlated to a "fist" representation; the "Shuffle" function may be associated with a "thumbs-up" hand pose representation, and the "Repeat" function may correspond to a "thumbs-down" representation.

Figure 2:
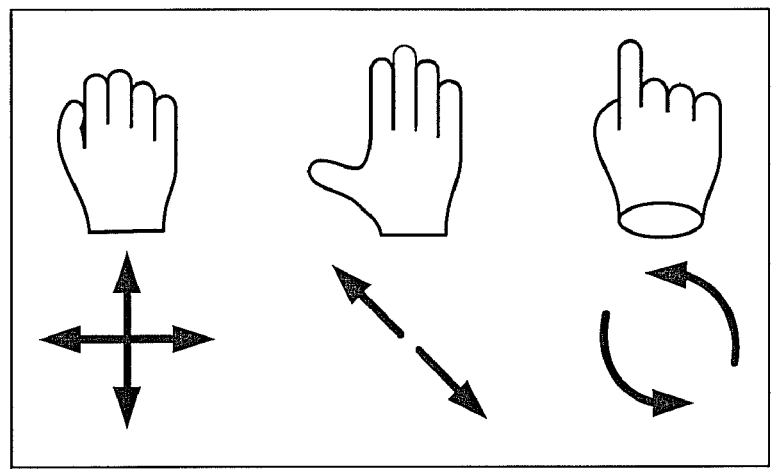
FIGS. 2 and 3 show illustrative graphical user interfaces for enabling a hand pose interaction with a computing device, according to an embodiment.
Figure 3:
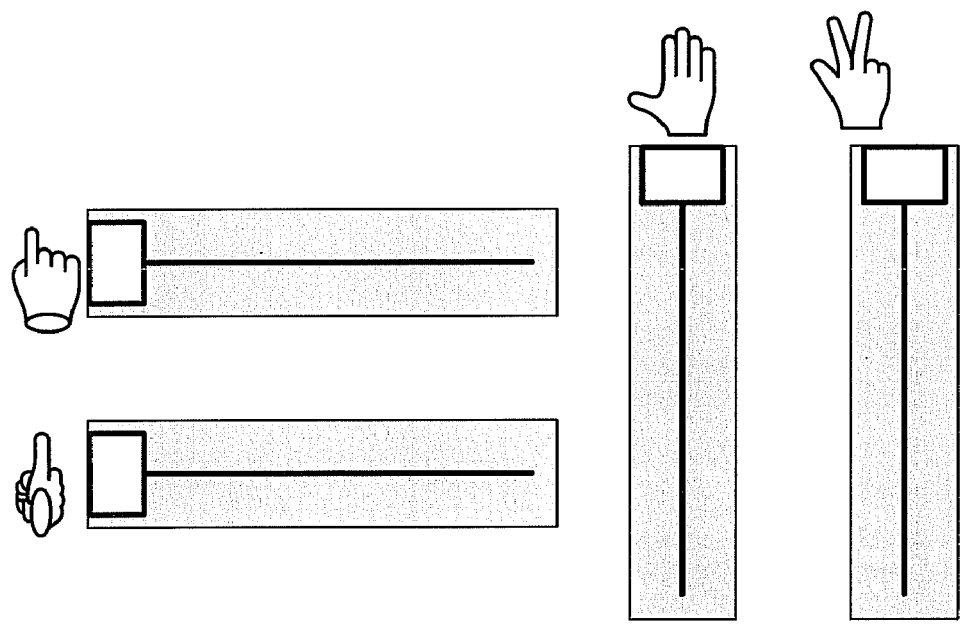

To provide another illustration (FIG. 2), let's consider a photo browsing application. In this case if a user wants to manipulate an object, different representations of hand pose can be assigned to individual controls related to the object. Once a user indicates his intent to manipulate an object (for example, by selecting it through any of the input modes mentioned earlier), a GUI is displayed on the computing device illustrating various functions associated with the selected object. Also displayed are unique hand pose representations corresponding to each function. FIG. 3 illustrates three different functions (related to an object) along with their corresponding hand pose representations: a "fist" hand pose representation corresponding to a "translate" function, a "palm" representation corresponding to a "scale" function and a "pointed finger" representation corresponding to a "rotate" function.

The above mentioned examples are for the purpose of illustration only and various other manifestations are possible.

The association between a hand pose representation (based on a human hand pose) and a function related to an object may be pre-defined in the computing system. In such case all such associations may be stored on a storage medium in the computing device. In another scenario, the association may be defined by a user. A GUI may be presented to the user that allows a user to easily map a hand pose representation to a function related to an object. The mapping is stored in the device for future reference.

Block 130 involves execution of the function (associated with the hand pose) upon recognition of a user hand pose corresponding to the hand pose representation in the graphical user interface.

The appearance of a GUI (with functions and corresponding hand pose representations) upon selection of an object on the computing device provides an indication to a user to perform a function by providing a hand pose gesture input corresponding to the hand pose representation. In an example, an explicit user instruction, such as, "Please make a hand pose corresponding to the function you want to select" may be displayed.

Once a user makes a hand pose corresponding to a hand pose representation in the graphical user interface, the computing device recognizes the hand pose (for example, through a depth camera) and performs the function associated with the hand pose representation. For example, in the media player application scenario mentioned earlier, if a user makes a "pointed finger" hand pose, the "Play" function is executed and the media player begins playing a media. In case a user provides a "fist" hand pose input, the "Stop" function would be activated and the media player will stop playing the media. To provide another example, in the context of earlier mentioned photo-browsing application, a "palm" representation would perform a "scaling" operation related to the object.

In another instantiation if the GUI (with functions and corresponding hand pose representations) related to a selected object is displayed on a secondary device (with a camera), a user could provide a hand pose input directly to the secondary device. In this case, the secondary device may either itself recognize the user hand pose or transfer the captured information to the original computing device for recognition. After a hand pose is recognized, the function associated with the hand pose is performed.

The execution of a function may involve giving control to the user. The user could further manipulate the object once the initial hand pose is recognized by the computing device. For example, if a "Scale" function requires a "palm" pose, then an initial "palm" pose user input may select the "Scale" function", however, further manipulations may be made by another gesture, such as hand or finger movements, to indicate the extent of scaling required.

In another aspect of the proposed solution, a hand pose may be associated with an object on a computing device. The associated hand pose is displayed adjacent to the object in a GUI and represents a functionality related to the object. To perform a function a user is simply required to make the associated hand pose.

Once a user makes a hand pose corresponding to a hand pose representation in the graphical user interface, the computing device recognizes the hand pose and allows a user to take control of the associated object. By taking control over an object a user is able to manipulate a functionality associated with the object. For example, if the associated object is a widget, the recognition of hand pose may lead to control (or further manipulation) of the widget. The GUI with a hand pose representation may be displayed next (adjacent) to the object (widget) to help in user recognition. FIG. 3 provides a representative example. In the illustration, each slider may be adjusted by making the hand pose displayed next to it. To start manipulating the slider, the user simply needs to make the relevant hand shape. After the hand shape has been recognized by the computing device, the control of the slider is passed to the user and the slider starts replicating the user's hand movement. The interaction could be ended either by selecting a different hand pose or by another mechanism, such as, by tapping the hand in mid-air.

Figure 4:
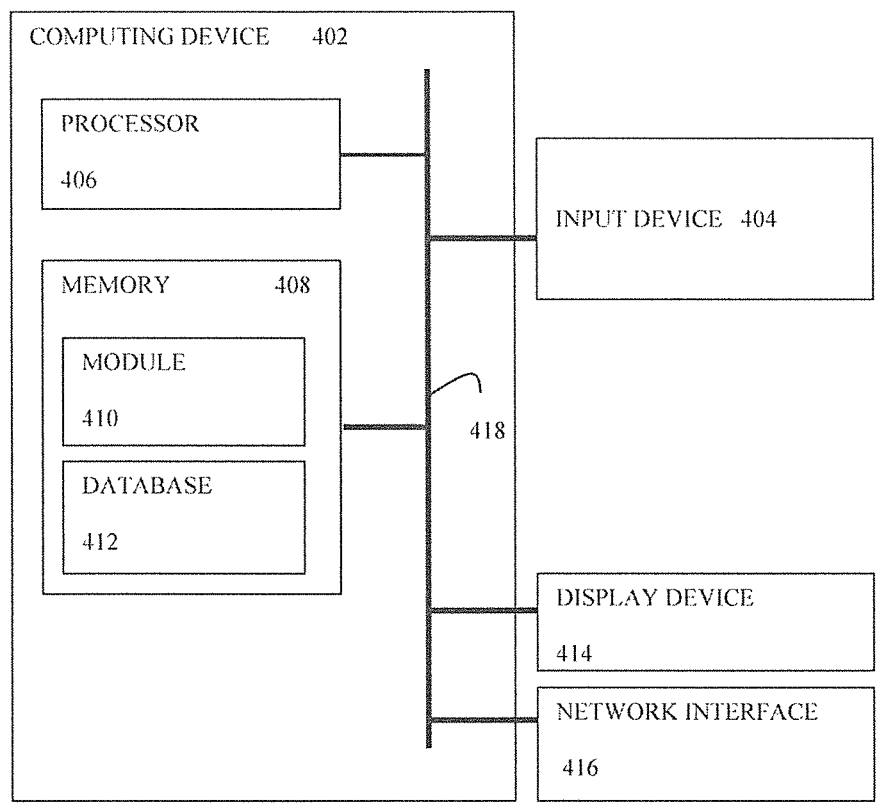
FIG. 4 shows a block diagram of a system for enabling a hand pose interaction with a computing device, according to an embodiment.

FIG. 4 shows a block diagram of a system 400 for enabling a hand pose interaction with a computing device, according to an embodiment.

The system 400 includes a computing device 402 and an input device 404. The input device 404 may be a separate device, which may be removably attachable to the computing device 402, or it may be integrated with the computing device 402. The computing device 402 may communicate with the input device 404 by wired or wireless means.

The computing device 402, may be, but not limited to, a personal computer, a desktop computer, a laptop computer, a notebook computer, a network computer, a personal digital assistant (PDA), a mobile device, a hand-held device, or the like.

The computing device 402 may include a processor 406, for executing machine readable instructions, a memory (storage medium) 408, for storing machine readable instructions (such as, a module 410) and a database 412, a display device 414 and a network interface 416. These components may be coupled together through a system bus 418. In an example, the display device, the input device and the processor are present together in a single computing device (unit).

Processor 406 is arranged to execute machine readable instructions. The machine readable instructions may be in the form of a module 410 or an application for executing a number of processes. In an example, the module may be involved in recognition of a user input related to selection of an object displayed on a computing device; display of a graphical user interface (GUI) corresponding to the object, the graphical user interface comprising at least one representation of a hand pose, wherein each representation of a hand pose corresponds to a unique function associated with the object; and execution of a function associated with the hand pose representation, upon recognition of a user hand pose corresponding to a hand pose representation in the graphical user interface.

It is clarified that the term "module", as used herein, means, but is not limited to, a software or hardware component. A module may include, by way of example, components, such as software components, processes, functions, attributes, procedures, drivers, firmware, data, databases, and data structures. The module may reside on a volatile or non-volatile storage medium and configured to interact with a processor of a computer system.

The memory 408 may include computer system memory such as, but not limited to, SDRAM (Synchronous DRAM), DDR (Double Data Rate SDRAM), Rambus DRAM (RDRAM), Rambus RAM, etc. or storage memory media, such as, a floppy disk, a hard disk, a CD-ROM, a DVD, a pen drive, etc. The memory 408 may include a module 410 and a database 412. The database may be used to store, inter alia, an association between a graphical user interface (GUI) and an object present on the computing device; objects and related functions, and hand pose representations corresponding to object functions.

The display device 414 may include a Virtual Display Unit (VDU) for displaying, inter alia, a graphical user interface (GUI) corresponding to an object, the graphical user interface comprising at least one representation of a hand pose, wherein each representation of a hand pose corresponds to a unique function associated with the object.

Network interface 416 may act as a communication interface between computing device 402, and display device 414 and input device 404.

Input device 404 may be used to recognize various input modalities of a user(s). Depending upon the user input modality to be recognized, the input device 404 configuration may vary. If gestures or gaze of a user needs to be recognized, input device 404 may include an input device along with a corresponding recognition module, i.e. a gesture recognition module and/or gaze recognition module. In case, the user input modality is speech, input device 404 may include a microphone along with a speech recognition module. The imaging device may be a separate device, which may be attachable to the computing device 402, or it may be integrated with the computing system 402. In an example, the imaging device may be a camera, such as a depth camera.

It would be appreciated that the system components depicted in FIG. 4 are for the purpose of illustration only and the actual components may vary depending on the computing system and architecture deployed for implementation of the present solution. The various components described above may be hosted on a single computing system or multiple computer systems, including servers, connected together through suitable means.

It will be appreciated that the embodiments within the scope of the present solution may be implemented in the form of a computer program product including computer-executable instructions, such as program code, which may be run on any suitable computing environment in conjunction with a suitable operating system, such as Microsoft Windows, Linux or UNIX operating system. Embodiments within the scope of the present solution may also include program products comprising computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer.

It should be noted that the above-described embodiment of the present solution is for the purpose of illustration only. Although the solution has been described in conjunction with a specific embodiment thereof, numerous modifications are possible without materially departing from the teachings and advantages of the subject matter described herein. Other substitutions, modifications and changes may be made without departing from the spirit of the present solution.

We claim:

1. A computer implemented method of hand pose interaction, comprising:
   recognizing a user input related to selection of an object displayed on a computing device;
   displaying a graphical user interface (GUI) corresponding to the object, the GUI comprising at least one representation of a hand pose, wherein the at least one representation of a hand pose corresponds to a unique function associated with the object; and
   subsequent the displaying of the GUI, recognizing a user hand pose corresponding to the at least one hand pose representation in the GUI; and
   executing the function associated with the hand pose representation in response to the recognizing of the user hand pose.

2. The computer implemented method according to claim 1, wherein the user input is provided by a gesture and/or a voice command.

3. The computer implemented method according to claim 1, wherein the GUI corresponding to the object is displayed on a secondary computing device.

4. The computer implemented method according to claim 3, wherein the recognition of a user input related to selection of an object occurs on the secondary computing device.

5. The computer implemented method according to claim 1, wherein the at least one representation of a hand pose comprises at least one of an image, animation and a drawing.

6. The computer implemented method according to claim 1, wherein the GUI corresponding to the object is displayed adjacent to the object.

7. The computer implemented method according to claim 1, wherein the unique function corresponding to the at least one representation of a hand pose is pre-configured.

8. The computer implemented method according to claim 1, wherein the unique function corresponding to the at least one representation of a hand pose is configurable at an option of a user, wherein configuring the unique function at the option of the user comprises:
   displaying a second GUI;
   receiving a mapping of the hand pose representation of the unique function through the second GUI; and
   storing the mapping.

9. The computer implemented method according to claim 1, wherein the at least one representation of a hand pose is a single hand pose representation or a two-hand pose representation.

10. A computer implemented method of hand pose interaction, comprising:
    displaying a graphical user interface (GUI) corresponding to an object, the GUI comprising a representation of a hand pose, wherein the hand pose representation corresponds to a function associated with the object;
    subsequent the displaying of the GUI, recognizing a user hand pose corresponding to the hand pose representation in the GUI; and
    upon recognition, allowing the user to control the object.

11. A system comprising:
    an input device that recognizes a user input related to selection of an object displayed on a computing device;
    a display device that displays a graphical user interface (GUI) corresponding to the object, the GUI comprising at least one representation of a hand pose, wherein the at least one representation of a hand pose corresponds to a unique function associated with the object; and
    a processor to
       recognize a user hand pose corresponding to the at least one hand pose representation in the GUI subsequent to the displaying of the GUI including the at least one representation of a hand pose, and
       in response to recognizing the user hand pose, instructing an application to execute the function associated with the at least one hand pose representation.

12. The system of claim 11, further comprising a camera for the recognition of a user hand pose corresponding to a hand pose representation in the GUI.

13. The system of claim 11, wherein the GUI corresponding to the object is displayed on a secondary computing device.

14. The system of claim 13, wherein the recognition of a user input related to selection of an object occurs on the secondary computing device.

15. The system of claim 11, wherein the secondary computing device is at least one of a mobile device, a tablet personal computer, a personal computer and a personal digital assistant.

16. The system of claim 11, wherein the processor is to configure the unique function, wherein to configure the unique function, the processor is to
    display a second GUI;
    receive a mapping of the hand pose representation of the unique function through the second GUI; and
    store the mapping.

17. The computer implemented method of claim 10, comprising:
    configuring the unique function, wherein the configuring includes display a second GUI;
receive a mapping of the hand pose representation of the unique function through the second GUI; and
store the mapping.

18. The computer implemented method of claim 10, wherein the GUI corresponding to the object is displayed on a secondary computing device.

* * * * *